United States Patent [19]

Merkle et al.

[11] 3,919,261

[45] Nov. 11, 1975

[54] PREPARATION OF 2,5-DIMETHYLFURAN-3-CARBOXYLIC ESTERS

[75] Inventors: Hans Rupert Merkle, Ludwigshafen; Hardo Siegel, Speyer, both of Germany

[73] Assignee: Badische Anilin- & Soda-Fabrik Aktiengesellschaft, Ludwigshafen (Rhine), Germany

[22] Filed: Jan. 31, 1973

[21] Appl. No.: 328,480

[30] Foreign Application Priority Data

Feb. 16, 1972  Germany............................ 2207098

[52] U.S. Cl............................ 260/347.5; 260/483
[51] Int. Cl.$^2$...................................... C07D 307/54
[58] Field of Search............................... 260/347.5

[56] References Cited
OTHER PUBLICATIONS

Dunlop and Peters, "The Furans," 1953, p. 642.
Gurrey, "Knoevenagel Reaction," 1954, pp. 103–104.
Gonzalez et al., "C.A.," Vol. 49 (5422 f).
Williams et al., "J. Amer. Chem. Soc.," Vol. 82, 1958, pp. 4883–4888.

*Primary Examiner*—Harry I. Moatz
*Attorney, Agent, or Firm*—Johnston, Keil, Thompson, Shurtleff

[57] ABSTRACT

Preparation of 2,5-dimethylfuran-3-carboxylic esters by reaction of acyloxypropionaldehyde with an acetoacetic ester.

6 Claims, No Drawings

PREPARATION OF 2,5-DIMETHYLFURAN-3-CARBOXYLIC ESTERS

The present invention relates to a simple and very efficient process for the production of 2,5-dimethylfuran-3-carboxylic esters.

It is known from German Patent No. 1,768,686, German Laid-Open Application DOS 2,019,535 and German Laid-Open Application DOS 2,006,471 that furan-3-carboxylic acid derivatives are excellent pesticides, particularly with regard to their fungicidal action. They are produced with 2,5-dimethylfuran-3-carboxylic acid, which is easily accessible by hydrolysis from 2,5-dimethylfuran-3-carboxylic esters.

It is known to produce furan-3-carboxylic acid derivatives by condensation of β-keto acid derivatives with α-hydroxyketones in the presence of Friedel-Crafts catalysts (Advances Heterocycl. Chem., 7, 377, 1966; DOS 2,006,471). It is a disadvantage of this production method that a large amount of catalyst is required for the reaction, making it difficult to isolate the product upon completion of the reaction. Furthermore, the catalyst attacks the hydroxyl groups in the α-hydroxyketone with the formation of by products.

Another well-known production method (Beilstein, 3, 754; 18, 197; II 273 and Chem. Ber., 85, 457, 1952) leads, via alkylation of the sodium salt of ethyl acetoacetate with chloroacetone followed by acid-catalytic cyclization of ethyl α-acetonyl acetoacetate, to the ethyl ester of 2,5-dimethylfurancarboxylic acid. However, this process is complicated and difficult to carry out on an industrial scale. The same applies to the production of 2,5-dimethylfuran-3-carboxylic acid by heating pyruvic acid or tartaric acid in accordance with Beilstein, 18, 297, II 273.

We have now found that alkyl esters of 2,5-dimethylfurancarboxylic acid of the formula

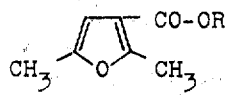

where R denotes lower alkyl (methyl, propyl, isopropyl, butyl, isobutyl, preferably ethyl), are obtained in a simple manner by condensing an α-acyloxypropionaldehyde of the formula

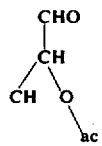

where ac denotes acyl (formyl, propionyl, butyryl, isobutyryl, preferably acetyl), at a temperature of from −20° to +130°C with an acetoacetic ester of the formula $$CH_3—CO—CH_2—CO—O—R,$$

where R has the above meanings, and cyclizing the condensation product at a temperature of −20° to +130°C. The free acid may be obtained by known methods by hydrolysis of the ester.

The process of the invention proceeds in 2 stages. The 2 stages may be carried out one after the other in separate reaction vessels or, advantageously, in a single reaction vessel.

The first reaction stage is a condensation in accordance with Knoevenagel, and may be represented for instance as follows:

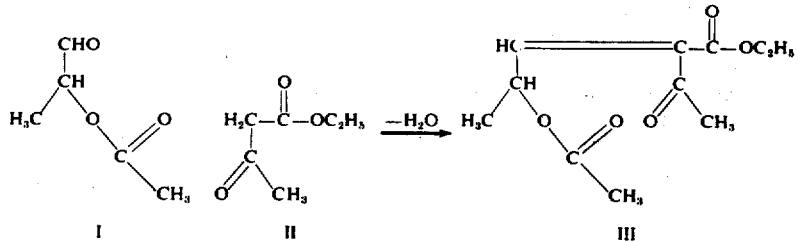

The condensation may be carried out without catalysts and at superatmospheric pressure (2 to 700 atmospheres gauge).

Condensation may advantageously be carried out in the presence of a catalyst usually used in the Knoevenagel condensation. Examples of such catalysts are catalytic amounts of a base, e.g., triethylamine, piperidine, pyrrolidine, alanine, pyridine, tri-nbutylamine, cyclohexylamine, sodium hydroxide and potassium hydroxide and their salts, e.g., acetates, hydrochlorides, carbonates and sulfates.

Further Knoevenagel condensation catalysts are described in Advances Heterocycl. Chem., 7, 377, 1966.

Solvents may be used in the condensation, for instance ether, benzene, toluene, chloroform, methylene chloride, tetrahydrofuran and dioxane. The base, e.g., pyridine, may also serve as solvent. It is particularly advantageous to carry out the reaction without a solvent.

Condensation may expediently be carried out in the presence of agents which bind water, e.g., dry $Na_2SO_4$, $CaSO_4$, $ZnO$, $ZnCl_2$, $CuSO_4$, silica gel, $Al_2O_3$ and $MgSO_4$. However, the water of reaction may also be removed by conventional methods by azeotropic distillation with the aid of solvents (methylene chloride, benzene, toluene, chloroform).

The second reaction stage is a cyclization. Cyclization of the compound of formula III to the ethyl ester of 2,5-dimethylfuran-3-carboxylic acid IV occurs partially during the Knoevenagel condensation and may be represented as follows:

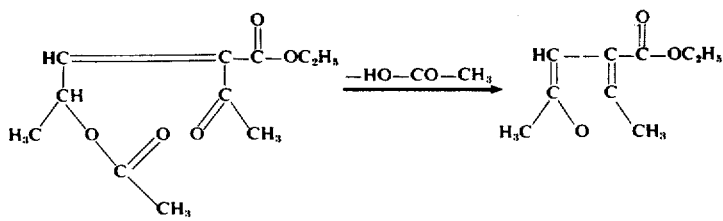

Cyclization is particularly accelerated by elevated temperature, superatmospheric pressure or by a cyclization catalyst, e.g., an acid, as described in Advances Heterocycl. Chem., 7, 377, 1966 for the cyclization of 1,4-dicarbonyl compounds, e.g., toluenesulfonic acid, sulfuric acid, montmorillonite, acidic ion exchangers, $ZnCl_2$, $AlCl_3$ and phosphoric acid.

The esters obtained by the process of the invention are pure, and the carboxylic acid obtained from them by hydrolysis may be used direct for the synthesis of active ingredients for use as plant protection agents.

The process of the invention is illustrated by the following examples.

EXAMPLE 1

At 0° to 10°C, 0.3 part (by weight) of piperidine and 3 parts of $Na_2SO_4$ were added to a well stirred mixture of 11.6 parts of α-acetoxypropionaldehyde and 13.0 parts of ethyl acetoacetate. The mixture was stirred overnight at room temperature. Gas-chromatographic analysis of the reaction product the following day showed that the condensation product III which had formed had already partially cyclized to the ethyl ester of 2,5-dimethylfuran-3-carboxylic acid IV. The ring was closed by adding 0.2 part of toluenesulfonic acid at 50°C.

The ester was dissolved in 0.2 part of 40% ethyl alcohol and hydrolyzed at 70°C with 10 parts of 50% caustic solution.

After the mixture had cooled it was acidified with dilute HCl and the yellow precipitate was filtered off and dried.

Yield: 12.4 parts (74%) of 2,5-dimethylfurancarboxylic acid, m.p. 136°C.

EXAMPLE 2

11.6 parts of α-acetoxypropionaldehyde and 13 parts of ethyl acetoacetate were kept for 8 hours at 40°C and a nitrogen pressure of 150 atmospheres in a shaking autoclave. The gas chromatograph of the reaction product revealed, in addition to compound III, a considerable amount of IV.

To complete cyclization the oil was stirred with 0.3 part of concentrated $H_2SO_4$ for 2 hours at 50°C. 14.3 g (85% yield) of the ethyl ester of 2,5-dimethylfuran-3-carboxylic acid was obtained by distillation; b.p. (0.4 mm Hg): 45° to 51°C.

EXAMPLE 3

A mixture of 14.5 parts of α-acetoxypropionaldehyde and 16.25 parts of ethyl acetoacetate was slowly added to 10 parts of pyridine containing a few drops of piperidine; the temperature was maintained at +10°C.

The mixture was then stirred for 8 hours at 40°C, and then neutralized with dilute HCl. The oil was worked up as described in Example 2 to the ethyl ester of 2,5-dimethylfuran-3-carboxylic acid.

Yield: 19 parts (90.5%)

EXAMPLE 4

At room temperature, 0.5 part of piperidine acetate was added to a solution of 17.4 parts of α-acetoxypropionaldehyde and 19.5 parts of ethyl acetoacetate in 250 parts of benzene. The mixture was then boiled overnight, the water being removed by azeotropic distillation. Subsequently 0.5 part of toluenesulfonic acid was added and the mixture boiled for 2 hours under reflux. After evaporation of the benzene, the remaining yellowish brown oil was distilled in a high vacuum.

Yield: 19.9 parts (79%) of the ethyl ester of 2,5-dimethylfuran-3-carboxylic acid.

We claim:

1. A process for the production of an alkyl ester of 2,5-dimethylfurancarboxylic acid of the formula

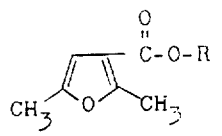

where R denotes lower alkyl, wherein an α-acyloxypropionaldehyde of the formula

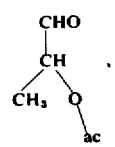

where ac denotes acyl, is condensed in the presence of a catalytic amount of a base at a temperature of from −20° to +130°C with an acetoacetic ester of the formula

where R has the above meanings, and the condensation product is cyclized at a temperature of from −20° to +130°C.

2. A process as claimed in claim 1 wherein condensation is carried out at a pressure of from 2 to 700 atmospheres gauge.

3. A process as claimed in claim 1 wherein R denotes alkyl having 1-4 carbon atoms.

4. A process as claimed in claim 1 wherein the cyclization of the condensation product is carried out in the presence of a catalytic amount of toluene sulfonic acid, sulfuric acid, montmorillonite, an acidic ion exchanger, $ZnCl_2$, $AlCl_3$ or phosphoric acid.

5. A process as claimed in claim 1 wherein said α-acyloxypropionaldehyde is α-acetoxypropionaldehyde and said acetoacetic ester is ethylacetoacetate.

6. A process as claimed in claim 1 wherein the cyclization is conducted in the presence of a catalytic amount of an acid.

* * * * *